UNITED STATES PATENT OFFICE.

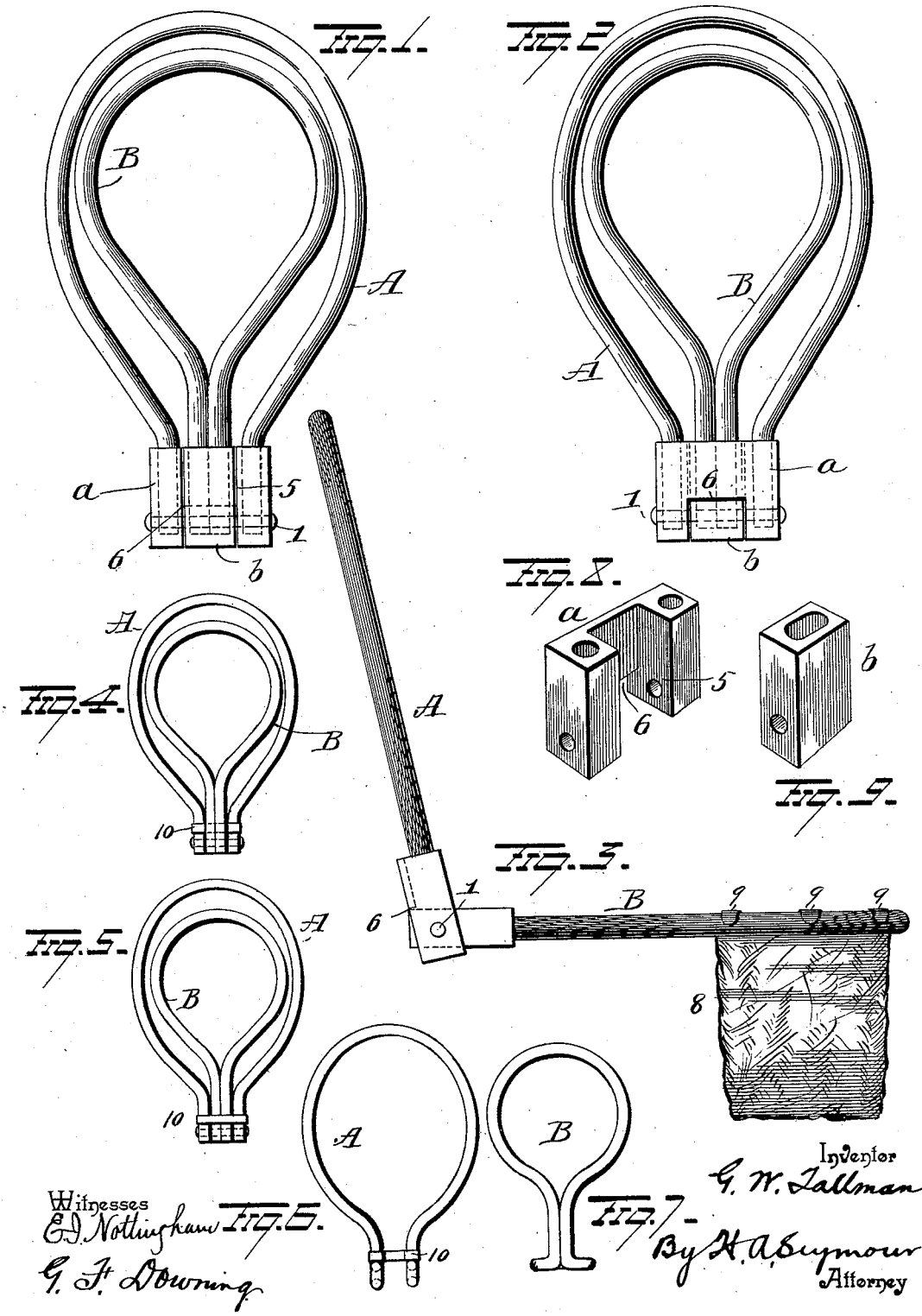

GEORGE W. TALLMAN, OF NEW YORK, N. Y.

ANIMAL-FEEDING DEVICE.

SPECIFICATION forming part of Letters Patent No. 599,748, dated March 1, 1898.

Application filed March 15, 1897. Serial No. 627,669. (No model.)

*To all whom it may concern:*

Be it known that I, GEORGE W. TALLMAN, a resident of New York, in the county of New York and State of New York, have invented certain new and useful Improvements in Animal-Feeding Devices; and I do hereby declare the following to be a full, clear, and exact description of the invention, such as will enable others skilled in the art to which it appertains to make and use the same.

My invention relates to an improvement in horse-feeding devices, the object being to provide a device which can be supported on the horse's neck like a collar, which will support the feed-bag in convenient position in front of the animal for him to eat. The advantages of the article may be briefly stated to be, first, that the feed may be eaten without lowering the head any considerable distance; second, a light device is produced which will not chafe the neck or be burdensome; third, a device which can be folded when not in use into a compact space.

With these ends in view my invention consists in certain novel features of construction and combinations of parts, which will be hereinafter described, and pointed out in the claims.

In the accompanying drawings, Figures 1 and 2 are front and rear views showing the device folded. Fig. 3 is a side elevation. Figs. 4 and 5 show front and rear views of a modified form of construction. Figs. 6 and 7 show detached members of another form of construction, and Figs. 8 and 9 are details.

A and B represent the two members of the device. These may be made of wood or metal and they are bent in substantially the forms shown and hinged at 1. The ends of the members are provided each with a block of metal *a* and *b*, respectively. One of these blocks has a recess 5, in which the other block operates. The block *a* has a notch 6 at one end, into which the extreme end of the block *b* of the other member drops when the device is open, and the inner side of this notch presents a shoulder 6, which limits the extent of opening of the device by the ends of the other frame striking thereagainst. When open, the device assumes the general form outlined in Fig. 3 and when closed it is perfectly flat and no thicker than either member shown.

As shown in Fig. 3, the bag 8 is detachably connected to the loop of member B by hooks 9 9 or other means, and the device when placed on the horse's neck is hooked over the hames or other part of the harness to retain it in position and prevent it from slipping off the neck or head.

In the modifications the blocks are omitted and a different form of hinge is used. In these forms a cross-bar 10 limits the extent of opening of the device.

It is evident that other slight changes might be made in the form and arrangement of the several parts described without departing from the spirit and scope of my invention, and hence I do not wish to limit myself to the precise details of construction herein shown; but, Having fully described my invention, what I claim as new, and desire to secure by Letters Patent, is—

1. A feeding device for animals comprising two members hinged together, one constructed to be supported around the neck of the animal and the other to hold the feed-bag at a suitable angle to the first member.

2. A feeding device for animals comprising two members hinged together, one smaller than the other and constructed and adapted to fold into the other, the larger member constructed to be supported around the neck of the animal and the smaller one to hold the feed-bag at a suitable angle to the larger member.

3. A feeding device for animals comprising two members hinged together, one member adapted to engage the neck of the animal and the other designed to support a feed-bag, one of said members having a shoulder which limits the extent of the opening of the other member.

4. As an article of manufacture, a feeding device for animals comprising two members hinged together at one end whereby they may be folded together, one member adapted to engage the animal and support the other member at a suitable angle to the first member, substantially as set forth.

In testimony whereof I have signed this specification in the presence of two subscribing witnesses.

GEORGE W. TALLMAN.

Witnesses:
JOHN ROBT. JOHNSTON,
ALEXANDER KYLE.